United States Patent [19]

Nixon et al.

[11] 4,444,715

[45] Apr. 24, 1984

[54] METHOD OF MAKING TIRES

[75] Inventors: Bryan E. Nixon, Akron; George M. Stoila, Kent; Stephen L. Williams, Doylestown, all of Ohio

[73] Assignee: The Goodyear Tire & Rubber Company, Akron, Ohio

[21] Appl. No.: 508,277

[22] Filed: Jun. 27, 1983

Related U.S. Application Data

[63] Continuation-in-part of Ser. No. 480,713, Mar. 31, 1983, abandoned.

[51] Int. Cl.³ .......................... B29H 5/02; B29H 5/08
[52] U.S. Cl. .................................. 264/501; 264/315; 425/33; 425/38; 425/36; 425/43; 425/44; 425/58
[58] Field of Search ............... 425/28 R, 31, 32, 33, 425/35, 36, 39, 43, 47, 58, 44, 23; 264/501, 502, 315

[56] References Cited

U.S. PATENT DOCUMENTS

| | | | |
|---|---|---|---|
| 2,730,763 | 1/1956 | Brundage | 18/17 |
| 2,778,060 | 1/1957 | Brundage | 425/36 |
| 2,858,566 | 11/1958 | Brundage | 425/33 |
| 2,997,740 | 8/1961 | Soderquist | 425/32 |
| 3,052,920 | 9/1962 | Harris | 425/33 |
| 3,097,394 | 7/1963 | Mallory et al. | 18/17 |
| 3,153,263 | 10/1964 | Mallory et al. | 18/17 |
| 3,278,990 | 10/1966 | Joseph et al. | 425/36 X |
| 3,378,882 | 4/1968 | Turk et al. | 18/2 |
| 3,396,221 | 8/1968 | Balle et al. | 425/43 X |
| 3,443,280 | 5/1969 | Hugger | 425/36 X |
| 3,522,626 | 8/1970 | Balle | 425/38 X |
| 3,530,533 | 9/1970 | Turk et al. | 18/2 |
| 3,574,893 | 4/1971 | Balle et al. | 425/43 X |
| 3,579,736 | 5/1971 | Balle et al. | 425/38 |
| 3,584,335 | 6/1971 | Ulm et al. | 18/2 |
| 3,685,929 | 8/1972 | Yoshida et al. | 425/38 |
| 3,794,457 | 2/1974 | Gazuit | 425/28 R |
| 3,917,791 | 11/1975 | Kratochoil et al. | 425/32 X |
| 3,976,409 | 8/1976 | Athey | 425/33 X |
| 4,029,449 | 6/1977 | Longaberger | 425/36 X |
| 4,144,006 | 3/1979 | Iuchi | 425/33 |
| 4,236,883 | 12/1980 | Turk et al. | 425/32 |
| 4,338,064 | 7/1982 | Singh et al. | 425/38 |

FOREIGN PATENT DOCUMENTS

5717704 12/1979 Japan.
56-70933 6/1981 Japan.
57-117940 7/1982 Japan.
57-117941 7/1982 Japan.

Primary Examiner—J. Howard Flint, Jr.
Attorney, Agent, or Firm—Frederick K. Lacher; T. P. Lewandowski

[57] ABSTRACT

A radial tire having an annular cavity is built with precision and positioned between the upper and lower mold sections of a tire press. An upper center mechanism has an inflatable clamping bladder for gripping the upper bead of the tire which is suspended from the center mechanism to insure orientation of the tire components in substantially the built condition of the tire. The upper center mechanism including the upper bead ring and clamping bladder is lowered to grip and center the upper bead on the upper bead ring. The lower bead is positioned over the lower bead ring and sealing air may be utilized to provide the necessary centering and seating. The sealing air in the tire cavity is maintained at a pressure sufficient to hold the beads in seating engagement with the bead rings while the curing bladder is being inserted in the tire cavity and while the clamping bladder is deflated and retracted with the center support assembly from the tire cavity. The press may then be closed for vulcanizing the tire without distortion by the curing bladder. The annular inflatable clamping bladder is mounted on an upper center support assembly of the upper center mechanism for movement with the assembly upward into a retracted storage position in an upper well of the upper center mechanism and downward into an operating position for inflation and engagement with the upper bead of the tire.

24 Claims, 8 Drawing Figures

METHOD OF MAKING TIRES

This application is a continuation-in-part of copending U.S. patent application Ser. No. 480,713 filed Mar. 31, 1983 now abandoned and relates to tire presses and especially to a method of vulcanizing tires.

In the building of radial tires the beads are precisely positioned and the cords of the reinforcing plies are placed at predetermined optimum angles relative to the cords of other plies and relative to a midcircumferential plane of the shaped tire. It has been found, however, that when a tire is vulcanized with a curing bladder, the curing bladder may misalign the uncured tire in the press causing distortion of the beads and cord angles of the uncured tire due to the nonuniformity or misalignment of the bladder relative to the tire. This distortion has caused nonuniformity with undesirable increases in average repeating and nonrepeating force inputs in the radial and lateral directions and undesirable increases in lateral runout and dynamic imbalance of the tire.

With the present invention, the uncured tire is loaded and the beads centered and seated on the bead rings before insertion of the curing bladder. The curing bladder is inserted in the tire after the beads are seated so that the amount of bladder nonuniformity and/or misalignment transmitted to the tire is minimized.

This method is in contrast to one prior art method in which the beads are seated only after the curing bladder is inserted in the tire. It is also a departure from another prior art method in which the bladder is inserted in the tire while only one bead is seated and the other bead is held in a loader. Thereafter the other bead is seated on the remaining bead ring. Neither of these methods limits the distortion in the press operation caused by nonuniformity and/or misalignment of the curing bladder to consistently acceptable values.

Apparatus to perform the method of this invention provides for gripping the upper bead of the tire with an upper center mechanism incorporating an annular expandable clamping bladder. The deflated clamping bladder is retractable into a space between a clamping bladder center support assembly and a well when the support assembly is retracted. The support assembly includes the upper bead ring which may be extended to seat the upper bead of the tire at a position spaced from the upper mold section so as to hold the tire away from the heated upper mold section. An elastic inflatable clamping bladder has been proposed in the prior art for urging a bead against a lower bead ring of a tire press; however, no provision has been made for mounting the bladder on a separate clamping bladder center supporting assembly in a well so that the bladder may be moved into the well for storage and out of the well for inflation and gripping of the bead. Further the center supporting assembly can vertically move the bead and tire to locate and center either or both of them.

In accordance with one aspect of the invention, there is provided a method of vulcanizing an uncured tire in a tire press having an upper mold section with an upper bead ring for engaging an upper bead of the tire, a lower mold section with a lower bead ring for engaging a lower bead of the tire, a lower center mechanism on the lower mold section for containing a curing bladder, an axially movable upper center mechanism on the upper mold section for gripping and centering the upper bead on the upper bead ring and for suspending the tire from the upper mold section comprising: (a) opening the tire press providing a space between the upper mold section and the lower mold section for the tire; (b) positioning the tire between the lower mold section and the upper mold section; (c) lowering the upper center mechanism relative to the upper mold section to grip and center the upper bead of the tire on the upper bead ring; and (c) suspending the tire by the upper bead ring at a position spaced from said upper mold section and said lower mold section to insure orientation of the tire components in tne built condition of the tire and centering of the lower bead over the lower bead ring.

In accordance with another aspect of the invention there is provided a method of vulcanizing an uncured tire in a tire press having an upper mold section with an upper bead ring for engaging an upper bead of the tire, a lower mold section with a lower bead ring for engaging a lower bead of the tire, comprising (a) opening the tire press providing a space between the upper mold section and the lower mold section for the tire; (b) positioning the tire in the space with the upper bead positioned under the upper bead ring and the lower bead positioned over the lower bead ring to provide an annular tire cavity; (c) injecting a fluid under pressure into the tire cavity to inflate the tire; and (d) inserting the curing bladder into the tire cavity.

In accordance with still another aspect of the invention there is provided a tire press comprising a center mechanism for mounting in a central opening in one half of a tire press including a well having a generally cylindrical side member, a bead ring of the press attached to an edge of the cylindrical side member, a clamping bladder center support assembly movable into and out of the well, an annular clamping bladder having at least one portion fastened to the outer periphery of the support assembly, the support assembly having a radially outer surface spaced from the radially inner surface of the cylindrical side member to provide space for the clamping bladder upon retraction of the support assembly into the well, means for raising and lowering the well in the central opening of the tire press, means to raise and lower the clamping bladder center support assembly in the well, means for inflating the clamping bladder to clamp a bead of an uncured tire against a bead ring in the extended position of the clamping bladder center support assembly when out of the well, and means for deflating the clamping bladder for storage between the well and the support assembly in the retracted position of the assembly when in the well.

In accordance with a further aspect of the invention there is provided a tire press for vulcanizing an uncured tire comprising an upper mold section with an upper bead ring for engaging an upper bead of the tire, a lower mold section with a lower bead ring for engaging a lower bead of the tire, means for opening the press providing a space between the upper mold section and the lower mold section, means for positioning the tire in said space with the upper bead positioned under the upper bead ring and the lower bead positioned over the lower bead ring to provide an annular tire cavity, and means for injecting a fluid under pressure into the tire cavity to assist in centering and seating at least one of the beads on the bead rings, means for inserting a curing bladder into the tire cavity.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

IN THE DRAWINGS

Figure 1:
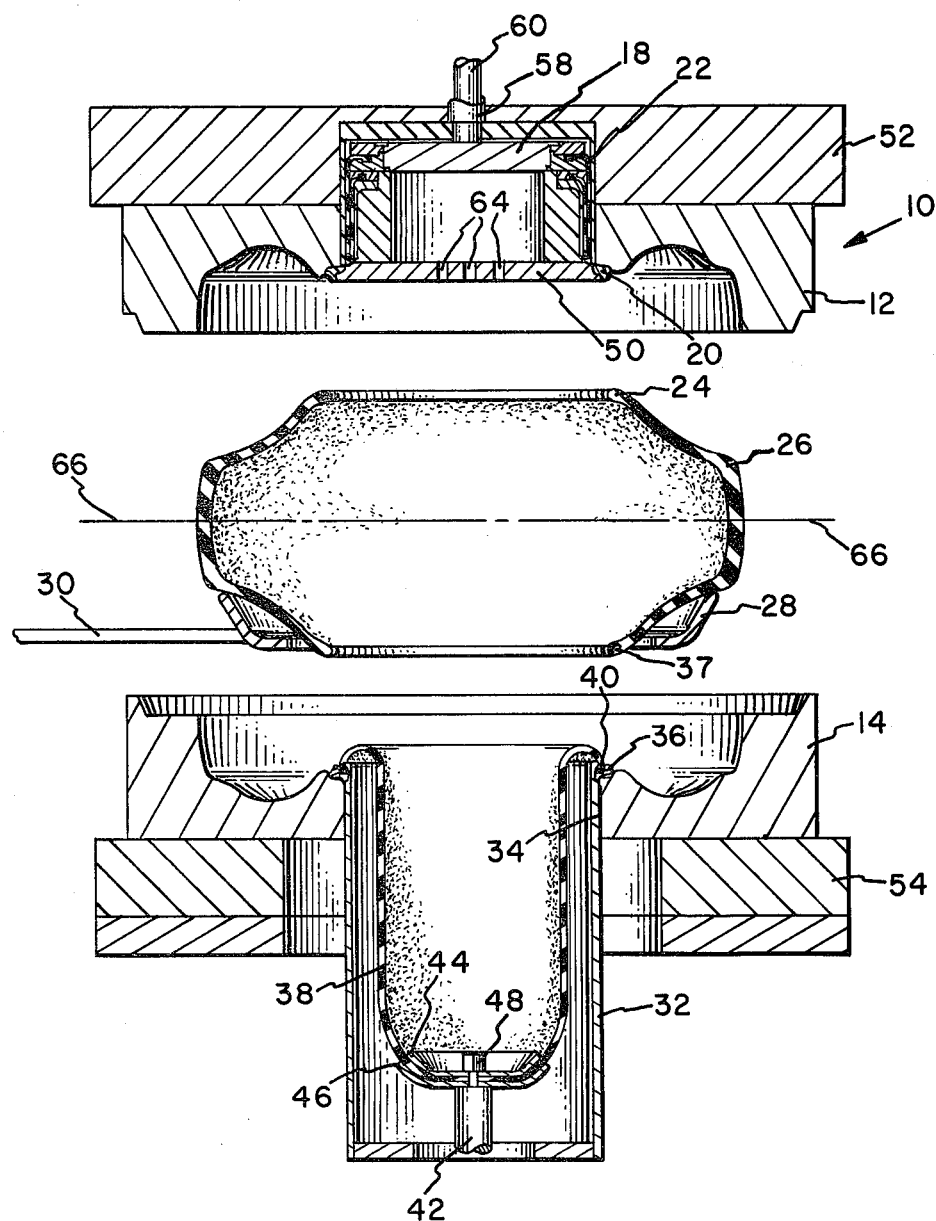
FIGS. 1 through 7 are schematic half-sectional views of a tire press construction of this invention showing the tire during the loading, vulcanizing and unloading steps embodying the method of this invention.
Figure 2:
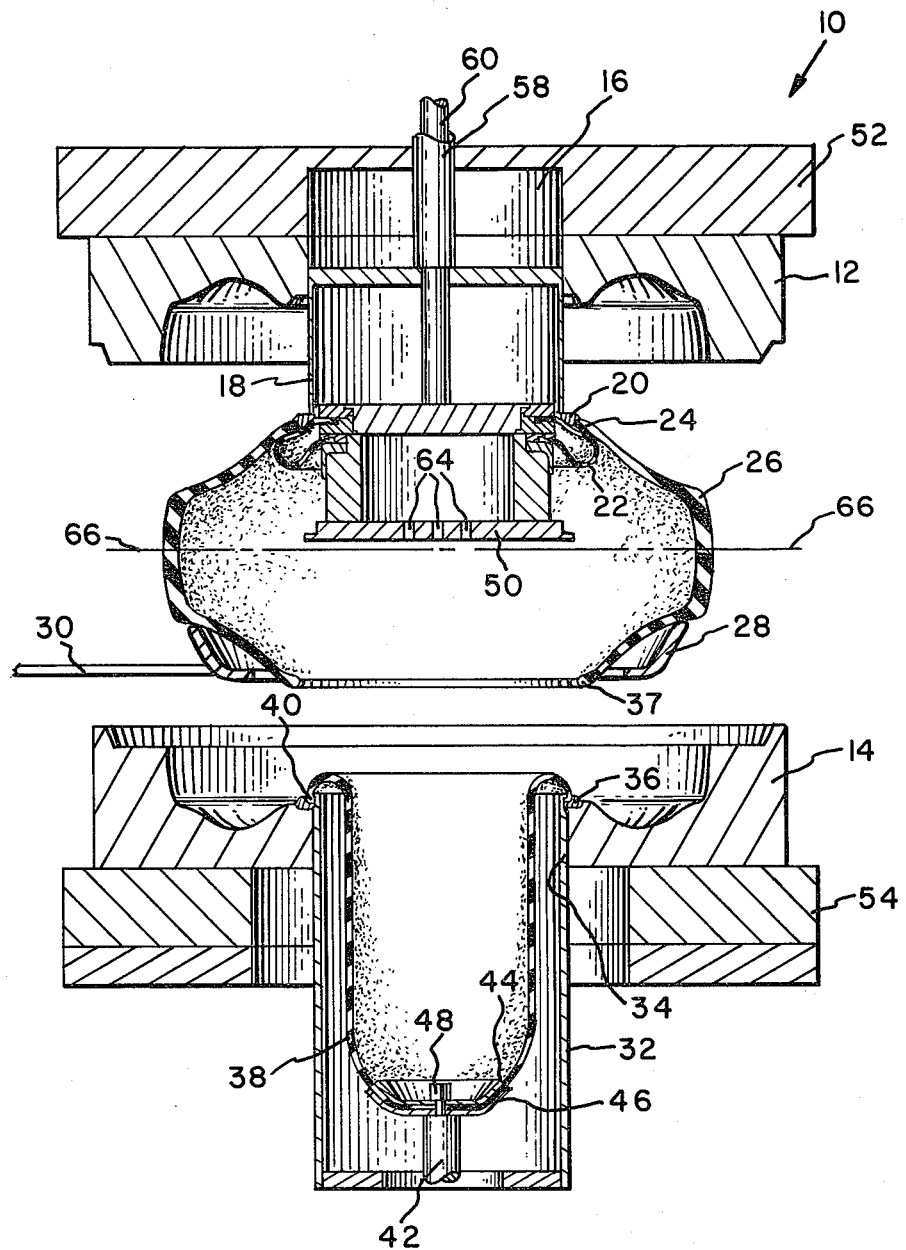

Referring to the drawings and especially to FIGS. 1 and 2, a tire press 10 is shown having an upper mold section 12 and a lower mold section 14 for curing passenger tires. These mold sections 12 and 14 may also be of a sectional type for certain applications as, for example, the curing of truck tires.

In the upper half of the tire press 10 there is provided a downwardly opening well or central opening 16 for receiving bead elevator means such as an upper center mechanism 18 which may be lowered into the space between the mold sections 12 and 14 or retracted into the central opening. The upper center mechanism 18 includes upper bead ring 20 which is movable from a position in the upper mold section 12 to a position in the space between the mold sections 12 and 14. The upper center mechanism 18 also includes chuck means such as an annular inflatable clamping bladder 22 which may be moved downwardly into position within the annular tire cavity and adjacent the upper bead ring 20 (FIG. 2) where it may be inflated to a diameter greater than the inner diameter of an upper bead 24 of an uncured tire such as radial tire 26 for engaging the underside of the bead when supported on a suitable tire loader. Alternatively the tire 26 can be placed on the lower mold section 14. A supporting pan 28 on the loader is movable into a position between the upper and lower mold sections 12 and 14 on an arm 30. The pan 28 may be lowered and swung out of the space between the upper and lower mold sections 12 and 14 when the upper bead 24 of the tire 26 is gripped between the clamping bladder 22 and the upper bead ring 20.

A lower center mechanism 32 is positioned in an upwardly opening well such as central opening 34 in the lower mold section 14 of the tire press 10 and includes a lower bead ring 36 for receiving lower bead 37 of the tire 26 and lifting the lower bead to a position for unloading the tire from the press. Alternatively the lower center mechanism 32 may be of the type in which there is no bead lift. The lower center mechanism 32 contains a curing bladder 38 having an edge portion 40 clamped between the lower bead ring 36 and an edge of the center mechanism 32. As shown in FIGS. 1 and 2, the curing bladder 38 may be cup-shaped and may have a vertically movable post member 42 fastened to a central portion of the curing bladder as by clamping plates 44 and 46 held together by a screw 48 in threaded engagement with the post member.

Figure 6:
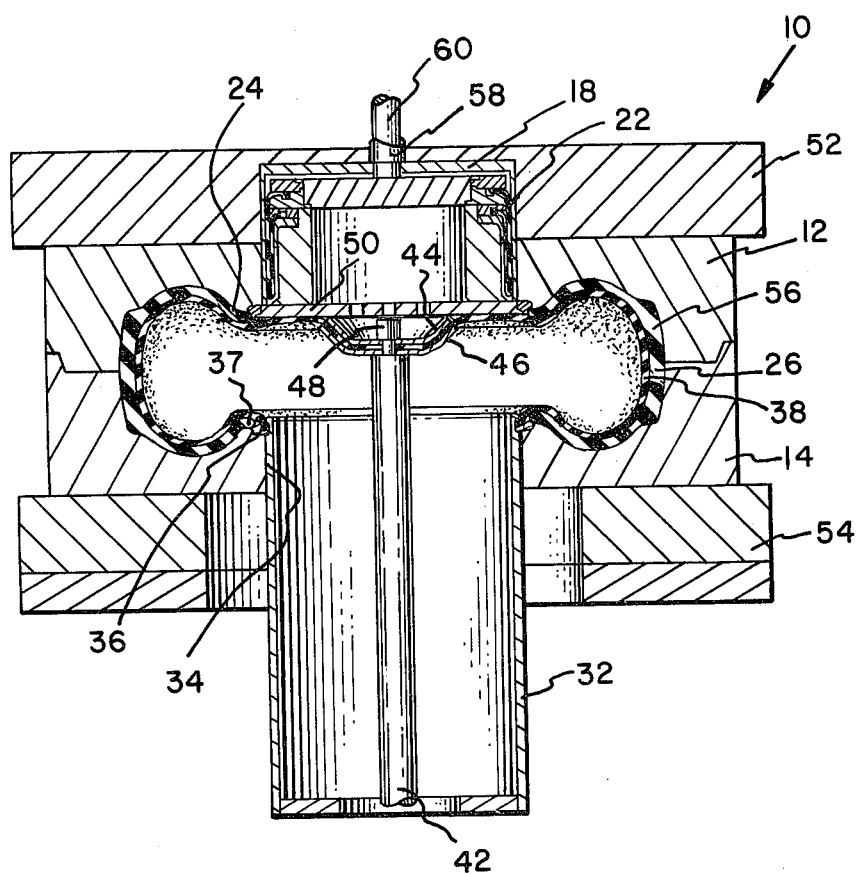

In the retracted condition shown in FIG. 1, the clamping bladder 22 is deflated and located in the central opening 16 with the upper center mechanism 18. A circular filler plate 50 fastened to the bottom of the upper center mechanism 18 fits in the space within the upper bead ring 20 to provide a supporting surface for the curing bladder 38 in the extended condition. Suitable press power means (not shown) connected to upper press member 52 and lower press member 54, which may be of a type well known in the art, is provided to close the upper mold section 12 against the lower mold section 14 providing a mold cavity 56 as shown in FIG. 6 for molding the tire 26. A curing medium such as steam or hot water may be provided to heat the mold sections 12 and 14 and fill the curing bladder 38 in the extended condition as shown in FIG. 6. The curing bladder 38 may also be manipulated by vertical movement of the post member 42 as by suitable power means such as a hydraulic mechanism or an electric motor. The lower bead ring 36 may also be raised and lowered with the lower center mechanism 32, when desired, by suitable power means well known to those skilled in the art.

The upper bead ring 20 may be connected to a hollow shaft 58 and the clamping bladder 22 may be connected to a rod 60 concentric with the shaft. The shaft 58 and rod 60 are actuated by suitable power means for raising and lowering the bead ring 20 and clamping bladder 22 the desired distances. Suitable power means may include pneumatic piston and cylinder assemblies and control means of a type well known to those skilled in the art.

Figure 3:
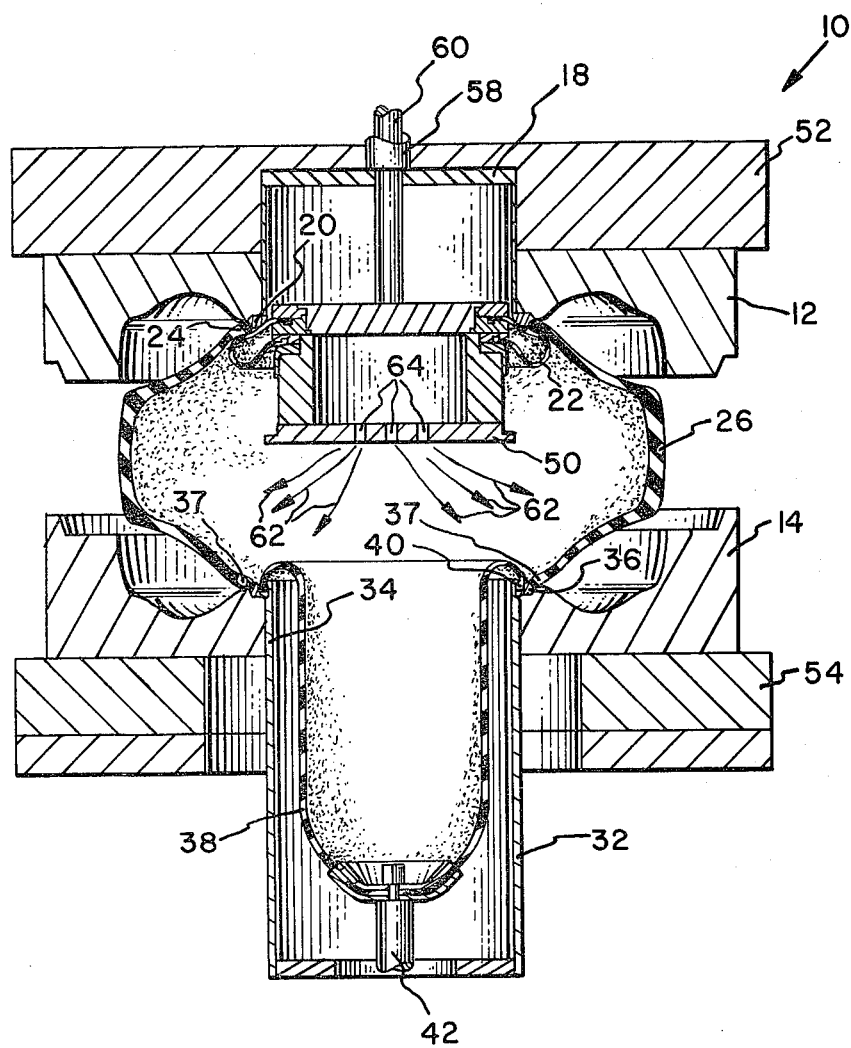
Figure 4:
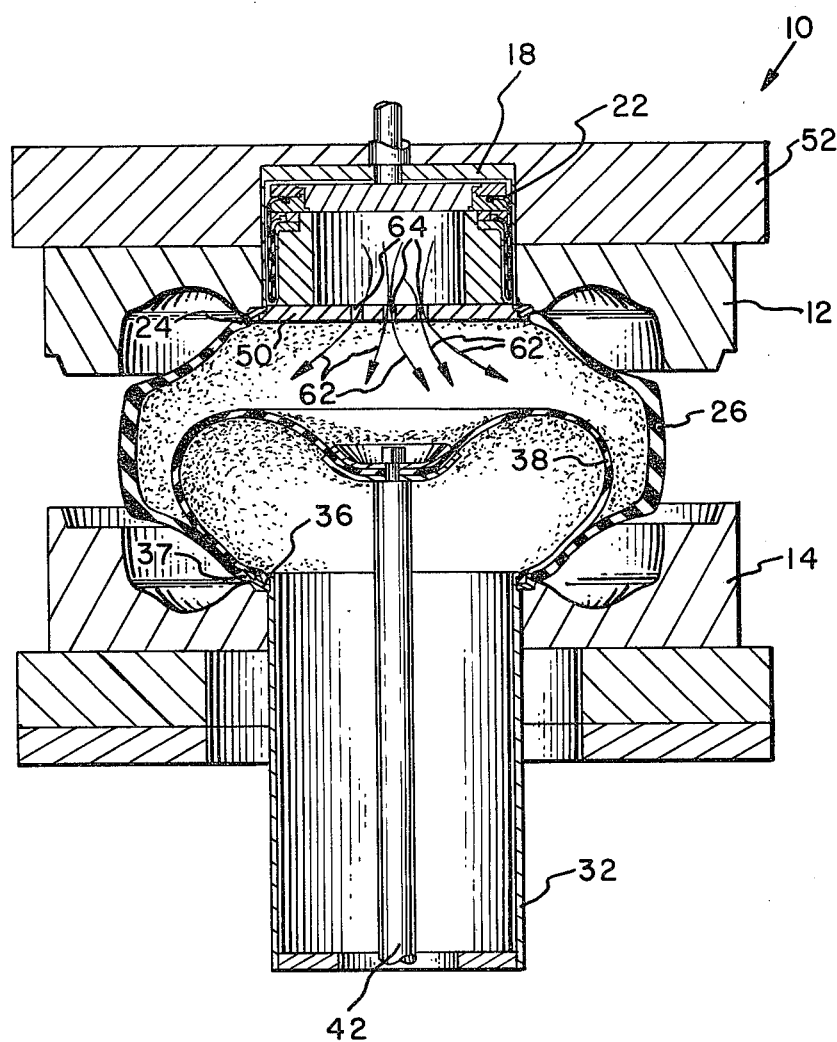

In addition to the curing medium, a fluid under pressure such as sealing air 62, illustrated by the arrows in FIGS. 3 and 4, may be communicated to the space behind the filler plate 50 for injection into the tire 26 through openings 64 in the plate to facilitate centering and seating of the lower bead 37 on the lower bead ring 36 and hold the upper bead 24 on the upper bead ring 20.

The tire 26 is preferably a tire which is built with the upper bead 24 and lower bead 37 precisely positioned and cords of reinforcing plies placed at predetermined optimum angles relative to cords of other plies and relative to a midcircumferential plane 66 of the shaped tire which has a "built" shape like that shown in FIGS. 1 and 2. When the tire 26 is supported by the upper bead 24 it will tend to assume under the influence of gravity the "built" the lower bead 37 will be in concentric alignment with the upper bead 24. There is a tendency to maintain this alignment due to the inherent centering properties of the radial and circumferential cords of the tire 26.

In operation, the press 10 is opened, as shown in FIG. 1, providing a space between the upper mold section 12 and lower mold section 14. The tire 26 is placed on the pan 28 of the loader and swung into position on arm 30. The tire 26 is then held in axial alignment with the press 10 as shown in FIG. 1. The upper center mechanism 18 is retracted as is the lower center mechanism 32. Also the curing bladder 38 is in the retracted position. The upper center mechanism 18 is then lowered relative to the upper mold section, as shown in FIG. 2, to grip and center the upper bead 24 on the upper bead ring 20. This is accomplished by lowering the upper bead ring 20 to a position in close proximity to the upper bead 24 in response to lowering of the shaft 58 and then lowering the clamping bladder 22 in response to lowering of the rod 60 to a position where the clamping bladder is positioned within the tire cavity and may be inflated with air or other suitable inflating medium. Upon inflation the clamping bladder 22 expands radially outward, rolling upwardly to provide a resilient shelf and press the upper bead 24 against the upper bead ring 20 in a centered position. When the clamping bladder 22 is fully inflated, the upper bead 24 is brought into registered contact with the upper bead ring 20 as shown in FIG. 2. Alternatively, the clamping bladder 22 can lift the upper bead 24 to clamp and center it against the upper bead ring 20.

The pan 28 of the loader may then be lowered and swung out of the space between the upper mold section 12 and lower mold section 14 on arm 30 of the loader. At that time, the upper center mechanism 18 may be raised uniformly with upper bead ring 20 relative to the upper mold section 12 to register and seat the ring in the upper mold section. Preferably the tire 26 is suspended from the upper center mechanism 18 with the upper bead 24 centered on the upper bead ring 20 and the lower bead 37 centered over the lower bead ring 36 at positions spaced from the mold sections 12 and 14 to provide for orientation of the tire beads, radial reinforcing cords of the plies and the circumferential cords of the tread belt under the influence of gravity.

Figure 5:
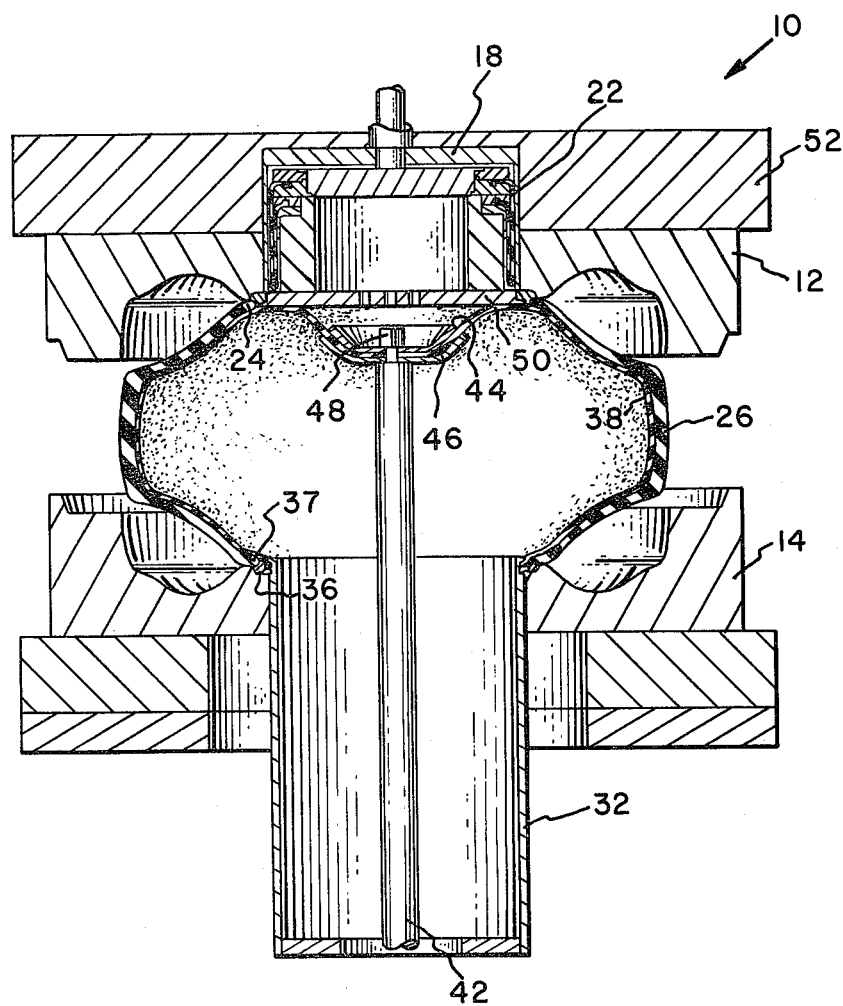

As shown in FIG. 3, the upper press member 52 is then lowered to a partially closed position of the press so that the lower bead 37 is seated on or close to the lower bead ring 36. To facilitate the centering and seating of the lower bead 37 relative to the lower bead ring, the sealing air 62 is introduced into the cavity within the tire 26 through the openings 64. The sealing air 62 may be air supplied to the tire press at about 30 psi (2.1 kg per sq cm) or a sufficient pressure to fully seat the lower bead 37 on the lower bead ring 36 and hold the upper bead 24 on the upper bead ring 20. The pressure of the sealing air 62 within the tire 26 may increase after the beads 37 and 24 are seated on the respective bead rings 36 and 20 providing air-tight seals between the beads and bead rings. The well at the opening 16 in the upper half of the press 10 and the well as the opening 34 in the lower mold section 14 are sealed to provide an essentially fluid-tight chamber with the tire positioned in the space between the mold section. In addition, the action of the sealing air 62 can shape the tire 26 and center the tire relative to the lower bead 37 and the lower bead ring 36. The upper press member 52 is lowered additionally to a position where the distance between the upper bead 24 and lower bead 37 is approximately one inch (2.54 cm) less than the distance between the upper bead 24 and lower bead 37 in the "built" condition of the tire 26. As shown in FIG. 3, the upper bead ring 20 is retracted into molding position in the upper mold section 12 either during the lowering of the upper press member 52 or prior to lowering of this press member. The clamping bladder 22 is maintained in the inflated condition until the lower bead 37 is seated at which time the sealing air 62 and the clamping bladder contribute toward sealing the upper bead 24 against the upper bead ring 20. The clamping bladder 22 is then deflated and retracted into the upper center mechanism 18 as shown in FIG. 4. This removes the plate 50 from the cavity within the tire 26 and provides room for the curing bladder 38 to be inflated and raised by the post member 42 for inserting into the tire cavity with a minimum of shaping of the tire. After the curing bladder 38 has been at least partially inserted into the tire cavity, the sealing air 62 is vented while maintaining sufficient fluid pressure for holding the upper bead 24 in sealing engagement with the upper bead ring 20 until the curing bladder completely fills the tire cavity. Full insertion of the curing bladder into the tire 26 is shown in FIG. 5. Referring to FIG. 6, the upper press member 52 has been lowered so that the upper mold section 12 and lower mold section 14 are in engagement and a curing medium such as steam or hot water may be injected into the curing bladder 38 and the mold sections heated for vulcanizing the tire 26.

Figure 7:
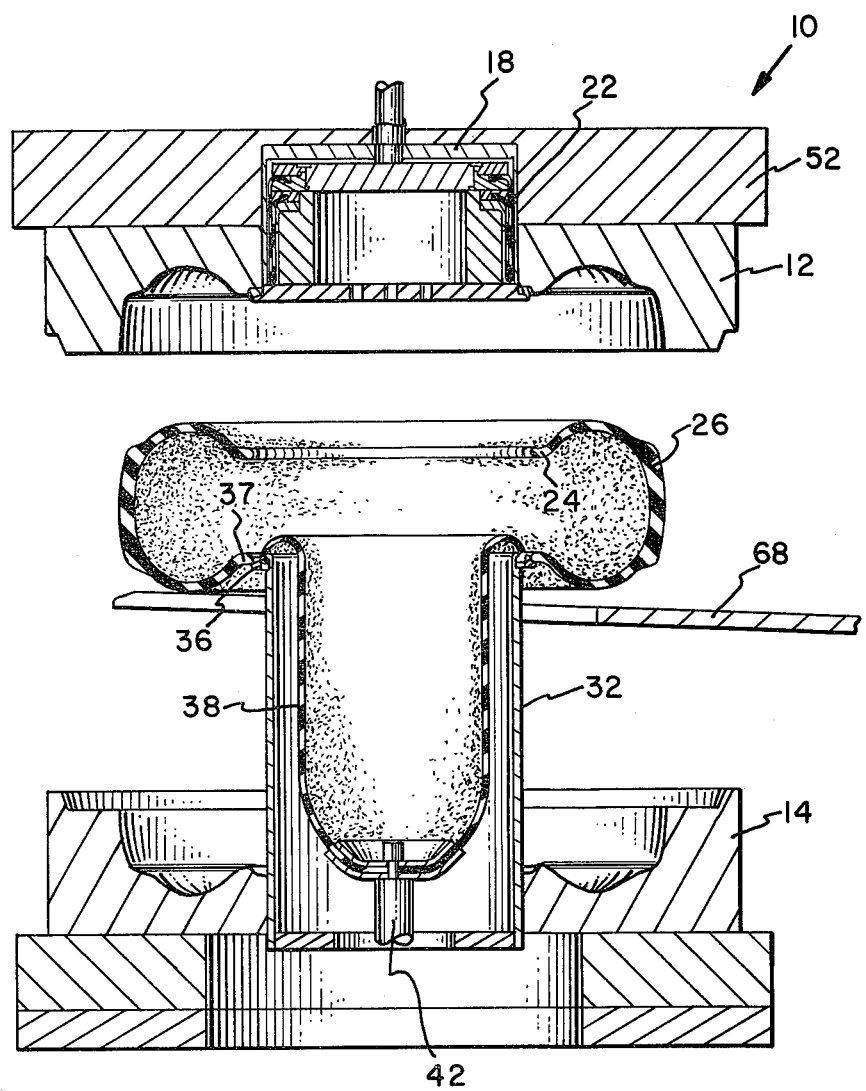

After the tire 26 has been vulcanized and the curing medium discharged, the curing bladder 38 is removed from the tire. The upper mold section 12 is then raised, as shown in FIG. 7, to disengage the tire 26 from the upper mold section 12 and then the lower center mechanism 32 is raised disengaging the tire from the lower mold section 14 and lifting the tire on the lower bead ring 36 to a position where an unloader 68 may be inserted beneath the tire. Then upon lowering of the lower center mechanism 32, the tire 26 will slide off the unloader 68 out of the space between the upper mold section 12 and lower mold section 14. The unloader 68 may then be removed and the press 10 is ready for repeating the cycle for vulcanizing the next tire.

An alternative method of unloading the tire 26 where the upper press member 52 is moved laterally with respect to the lower press member 54 after opening of the press 10 and there is no lower bead lift includes the following steps:

(1) As the press 10 opens an initial amount the upper mold section 12 is raised and the bead ring 20 is lowered with the upper center mechanism 18 so that the tire 26 is pushed out of the upper mold section. (2) The curing bladder 38 is then removed from the tire 26.

(3) The clamping bladder 22 is lowered into clamping position within the tire 26 and inflated.

(4) The press 10 is opened further by raising the upper mold section 12 to the fully opened position of FIG. 7 and this lifts the tire 26 to a position suspended on the upper press member 52.

(5) The upper center mechanism 18 is partially retracted until the upper bead ring 20 is seated in the upper mold section 12; however, the clamping bladder 22 remains extended and inflated.

(6) The upper press member 52 is moved laterally relative to the lower press member 54 to a position with the tire 26 over a conveyor.

(7) The clamping bladder 22 is deflated permitting the tire 26 to drop on the conveyor.

(8) The upper center mechanism 18 is then fully extended lowering upper bead ring 20 to make sure the tire 26 is ejected from the upper mold section 12.

(9) Finally the upper center mechanism 18 is fully retracted carrying the clamping bladder 22 into a stored position in a storage space of the central opening 16 in the upper mold section 12 with the upper bead ring 20 seated in the upper mold section.

Figure 8:
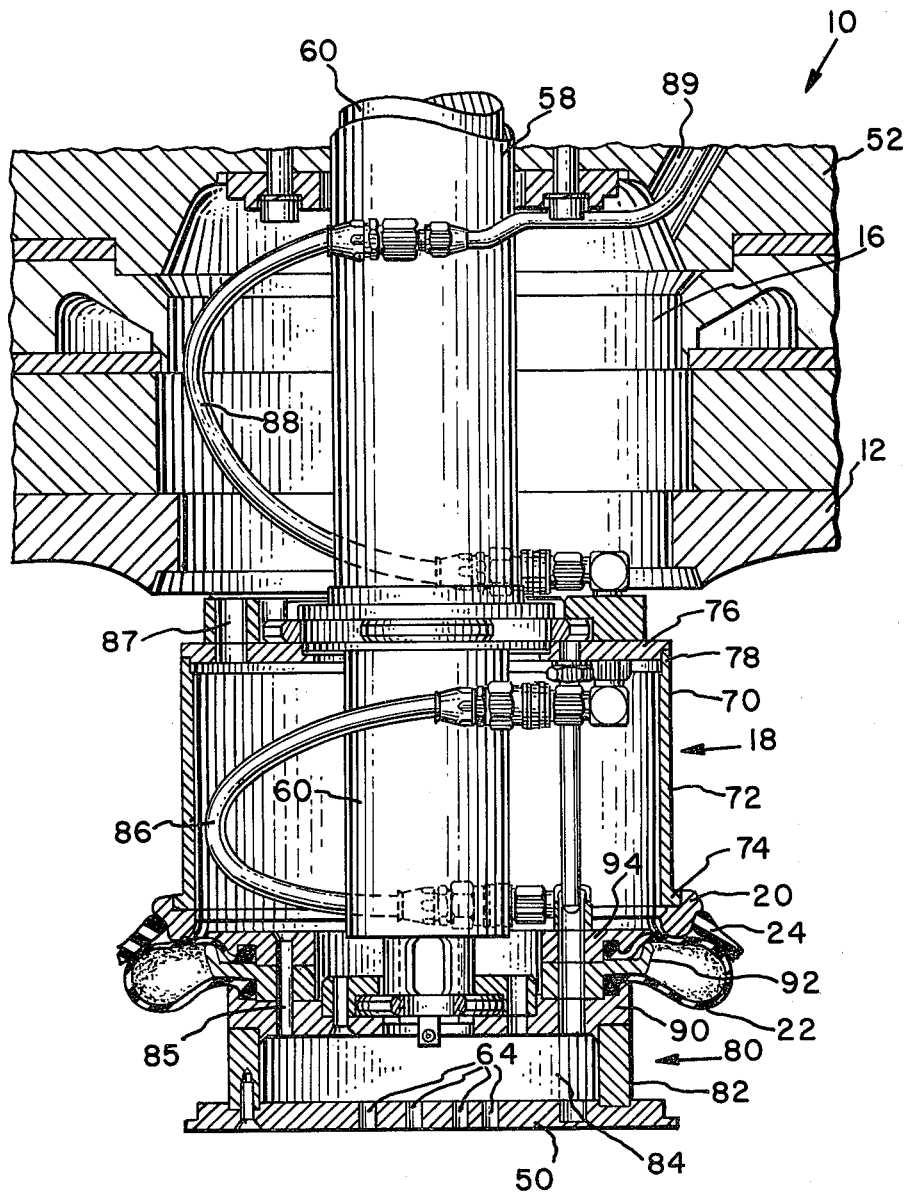
FIG. 8 is an enlarged fragmentary half-sectional view of the tire press upper mold section and center mechanism.

Referring to FIG. 8, the upper center mechanism 18 is shown in greater detail in a position lowered from the central opening 16 in the upper half of the tire press 10. An upper well 70 has a cylindrical side member 72 with a lower edge 74 attached to the upper bead ring 20. A plate member 76 is attached to upper edge 78 of the cylindrical side member 72 and is fastened to the shaft 58 extending upwardly through the upper press member 52. The rod 60 extends through the shaft 58 and the plate member 76 and is connected to a clamping bladder center support assembly 80. The annular clamping bladder 22, which may be of a resilient flexible material such as rubber reinforced with fabric having cords of reinforcing material such as nylon or rayon has at least a portion fastened to the outer periphery of the support assembly 80 which has a generally cylindrical radially outer surface 82. The filler plate 50 is mounted on the support assembly 80 providing a chamber 84 in communication through passages 85, 87 and 89 with a source of air under pressure to provide the sealing air 62 which may be injected through the openings 64 when the upper bead ring 20 is seated in the upper mold section 12. The passages 85, 87 and 89 may also be used to vent the cavity within the tire 26 for evacuation and maintaining the pressure of the sealing air 62 against the upper bead 24 during insertion of the curing bladder 38. Passages (not shown) leading to the clamping bladder 22 are in communication with the hoses 86 and 88 which are also connected to a source of inflating air to provide air under pressure for inflating the clamping bladder. Preferably air pressure in the range of from 40 psi (2.8 kg per sq cm) to 60 psi (4.2 kg per sq cm) is satisfactory for inflating the clamping bladder 22 and pressing the upper bead 24 against the upper bead ring 20 as shown in FIG. 8.

As stated hereinabove, the shaft 58 and rod 60 are connected to suitable power means for raising and lowering the center support assembly 80 and the upper well 70 between the position shown in FIG. 8 and the position shown in FIG. 1. Suitable controls may also be provided to control the duration and amount of movement of the shaft 58 and rod 60 as well as the other operations set forth hereinabove.

As shown in FIG. 8, a bladder support ring 90 on the center support assembly 80 cooperates with other bladder rings 92 and 94 to clamp the clamping bladder 22. The diameters of the bladder support ring 90 and bladder rings 92 and 94 are less than the inner diameter of the cylindrical side member 72 of the upper well 70. Furthermore, the diameter of the outer surface 82 of the support assembly 80 is less than the inner diameter of the side member 72 to provide a storage space for the clamping bladder 22 in the deflated condition when the support assembly 80 is retracted telescopically into the upper well 70, as shown in FIG. 1. The filler plate 50 is circular and has a diameter substantially the same as the diameter of the cylindrical side member 72 for closing the upper well 70 in the raised position of the support assembly 80.

With the apparatus and method described hereinabove, tires have been handled and vulcanized with a minimum of distortion by the curing bladder. These tires are superior to tires made with a similar press in which the curing bladder is inserted into the tire before the tire beads are centered and mounted on the bead rings.

While certain representative embodiments and details have been shown for the purpose of illustrating the invention, it will be apparent to those skilled in the art that various changes and modifications may be made therein without departing from the spirit or scope of the invention.

What is claimed is:

1. A method of vulcanizing an uncured tire in a tire press having an upper mold section with an upper bead ring for engaging an upper bead of said tire, a lower mold section with a lower bead ring for engaging a lower bead of said tire, a lower center mechanism on said lower mold section for containing a curing bladder, an axially movable upper center mechanism on said upper mold section for gripping and centering said upper bead on said upper bead ring and for suspending said tire from said upper mold section comprising:

(a) opening said tire press providing a space between said upper mold section and said lower mold section for said tire;
    (b) positioning said tire between said lower mold section and said upper mold section;
    (c) lowering said upper center mechanism relative to said upper mold section to grip and center said upper bead of said tire on said upper bead ring; and
    (d) suspending said tire by said upper bead ring at a position spaced from said upper mold section and said lower mold section to insure orientation of the tire components in the built condition of the tire and centering of said lower bead over said lower bead ring.

2. The method of claim 1 wherein said lower center mechanism is axially movable for raising and lowering said lower bead ring.

3. The method of claim 1 wherein said upper center mechanism is raised to lift said tire.

4. A method of vulcanizing an uncured tire in a tire press having an upper mold section with an upper bead ring for engaging an upper bead of said tire, a lower mold section with a lower bead ring for engaging a lower bead of said tire, comprising:

(a) opening said tire press providing a space between said upper mold section and said lower mold section for said tire;
    (b) positioning said tire in said space with said upper bead positioned under said upper bead ring and said lower bead positioned over said lower bead ring to provide an annular tire cavity;
    (c) injecting a fluid under pressure into said tire cavity to inflate said tire; and then
    (d) inserting a curing bladder into said tire cavity.

5. The method of claim 4 including the additional step of discontinuing said pressure of said fluid and venting said fluid to permit full insertion of said curing bladder into said tire cavity.

6. The method of claim 5 wherein said curing bladder is inserted into said tire cavity while said fluid is vented from said tire cavity.

7. The method of claim 4 wherein said upper bead and said lower bead are moved closer together before said curing bladder is inserted into said annular cavity within said tire.

8. The method of claim 4 wherein said fluid is injected into said tire cavity to facilitate seating of said lower bead on said lower bead ring and said upper bead on said upper bead ring and then allowing the pressure of said fluid in said tire cavity to increase to provide a fluid-tight seal between the beads and bead rings.

9. The method of claim 4 wherein said positioning step includes moving said upper bead into engagement with said upper bead ring and then holding the same against said upper bead ring as said tire is inflated.

10. The method of claim 8 wherein a clamping bladder is introduced into said tire cavity and inflated into engagement with one of the beads to assist in providing a fluid-tight seal with one of the bead rings.

11. The method of claim 10 wherein said bladder upon expansion distends radially outward and rolls axially upward to move said upper bead into registered contact with said upper bead ring.

12. The method of claim 1 or 4 further comprising moving the beads closer together to a position where the distance between the beads is less than the distance between the beads in the built tire condition for inserting said curing bladder without pulling the tire off center.

13. The method of claim 1 wherein said upper bead is gripped between an inflatable clamping bladder and said upper bead ring on said upper center mechanism.

14. The method of claim 4 wherein said upper bead ring is mounted on said upper center mechanism for lowering to grip and center said upper bead including the steps of:
   (a) raising said upper center mechanism relative to said upper mold section to seat said upper bead ring in said upper mold section;
   (b) partially closing said tire press to seat said lower bead on said lower bead ring to provide a tire cavity within said tire;
   (c) injecting a fluid under pressure into said tire cavity;
   (d) inserting said curing bladder into said tire cavity;
   (e) retracting said upper center mechanism from said tire cavity; and
   (f) venting said fluid from said cavity as said cavity is filled by said curing bladder.

15. The method of claim 14 wherein an inflatable clamping bladder is mounted on said upper center mechanism including the steps of:
   (a) lowering said upper center mechanism to a position with said clamping bladder inside said tire;
   (b) inflating said clamping bladder;
   (c) deflating said clamping bladder; and
   (d) retracting said clamping bladder from said tire cavity with said upper center mechanism.

16. The method of claim 1 or 4 wherein said upper bead and said lower bead of said tire are connected by generally radial reinforcing cords and said tire is built in a generally toroidal form with a tread belt of generally circumferential reinforcing cords.

17. The method of claim 4 wherein said tire is placed between said lower mold section and said upper mold section in axial alignment with said tire press by a loader carrying said tire and said loader is moved out of the space between said upper mold section and said lower mold section after said upper bead of said tire is gripped by said upper center mechanism.

18. The method of claim 4 wherein said lower bead is seated and centered on said lower bead ring during lowering of said upper center mechanism by the inherent centering properties of said tire built with radial and circumferential reinforcing cords in a generally toroidal form.

19. The method of claim 4 wherein said upper bead is held against said upper bead ring and said lower bead is held against said lower bead ring as said uncured tire is inflated.

20. The method of claim 19 wherein said holding step includes using an upper center mechanism in an upper half of said press to hold said upper bead against said upper bead ring.

21. The method of claim 18 further comprising inserting said curing bladder into said tire, closing said tire press so that said upper mold section and said lower mold section are in engagement, injecting a curing medium into said curing bladder to vulcanize said tire, discharging said curing medium from said curing bladder after vulcanization, raising said upper mold section to disengage said tire from said upper mold section, raising a lower center mechanism to disengage said tire from said lower mold section and lift said tire on said lower bead ring to a raised position, removing said curing bladder from said tire, inserting an unloader beneath said tire, and lowering said lower center mechanism so that said tire may slide off the unloader out of the space between said upper mold section and said lower mold section.

22. The method of claim 18 further comprising inserting said curing bladder into said tire, closing said tire press so that said upper mold section and said lower mold section are in engagement, injecting a curing medium into said curing bladder to vulcanize said tire, discharging said curing medium from said curing bladder after vulcanization, raising said upper mold section an initial amount, lowering said upper bead ring with said upper center mechanism to push said tire out of engagement with said upper mold section, removing said curing bladder from said tire, lowering a clamping bladder into clamping position within said tire, inflating said clamping bladder, raising said upper mold section to a fully opened position of said press lifting said tire to a position suspended on said upper bead, raising said upper center mechanism until said upper bead ring is seated in said upper mold section, and deflating said clamping bladder to permit said tire to drop on an unloader conveyor.

23. The method of claim 22 wherein after deflating said clamping bladder to permit said tire to drop said upper center mechanism is fully extended lowering said upper bead ring to insure ejection of said tire from said upper mold section.

24. A method of loading and shaping an uncured tire in a tire press for final shaping and vulcanizing, comprising the steps of:
   (a) positioning a green tire between axially separated mold sections of said press; then
   (b) elevating said tire into contact with an upper mold section;
   (c) lowering said uncured tire and said upper mold section while maintaining said contact until said tire contacts a lower mold section;
   (d) sealing the uncured tire beads;
   (e) shaping said uncured tire; and
   (f) closing said press.

* * * * *